United States Patent [19]
Breton et al.

[11] 3,831,515
[45] Aug. 27, 1974

[54] METHOD FOR CORING AND PRESSING JUICE FROM FRUITS HAVING A RIND

[75] Inventors: Roger J. Breton, Los Angeles; David F. Beck, San Juan Capistrano, both of Calif.

[73] Assignee: Roto Manufacturing, Inc., Westminster, Calif.

[22] Filed: Aug. 7, 1972

[21] Appl. No.: 278,281

Related U.S. Application Data

[62] Division of Ser. No. 55,538, July 16, 1970, Pat. No. 3,682,092.

[52] U.S. Cl. .............................................. 100/37
[51] Int. Cl. ......................... A46j 19/02, B30b 9/02
[58] Field of Search ............. 100/35, 37, 39, 41, 50, 100/51, 107, 108, 109, 218, 104, 105, 94, 98, 131

[56] References Cited
UNITED STATES PATENTS

| | | | |
|---|---|---|---|
| 2,420,680 | 5/1947 | Pipkin............................ | 100/108 X |
| 3,162,114 | 12/1964 | Quiroz................................ | 100/37 |
| 3,269,301 | 8/1966 | Krause........................... | 100/108 X |
| 3,381,608 | 5/1968 | Bengtsson.......................... | 100/108 |

*Primary Examiner*—Peter Feldman

[57] ABSTRACT

A method for juicing fruit having a rind and varying in hardness and size, and comprising generally the steps of supporting a said fruit, cutting an opening through the rind at one side thereof, then confining the said fruit and applying external pressure thereto thereby extruding a core through the opening cut through the rind and delivering the juice from said fruit via said opening and through said extruded core.

14 Claims, 16 Drawing Figures

PATENTED AUG 27 1974

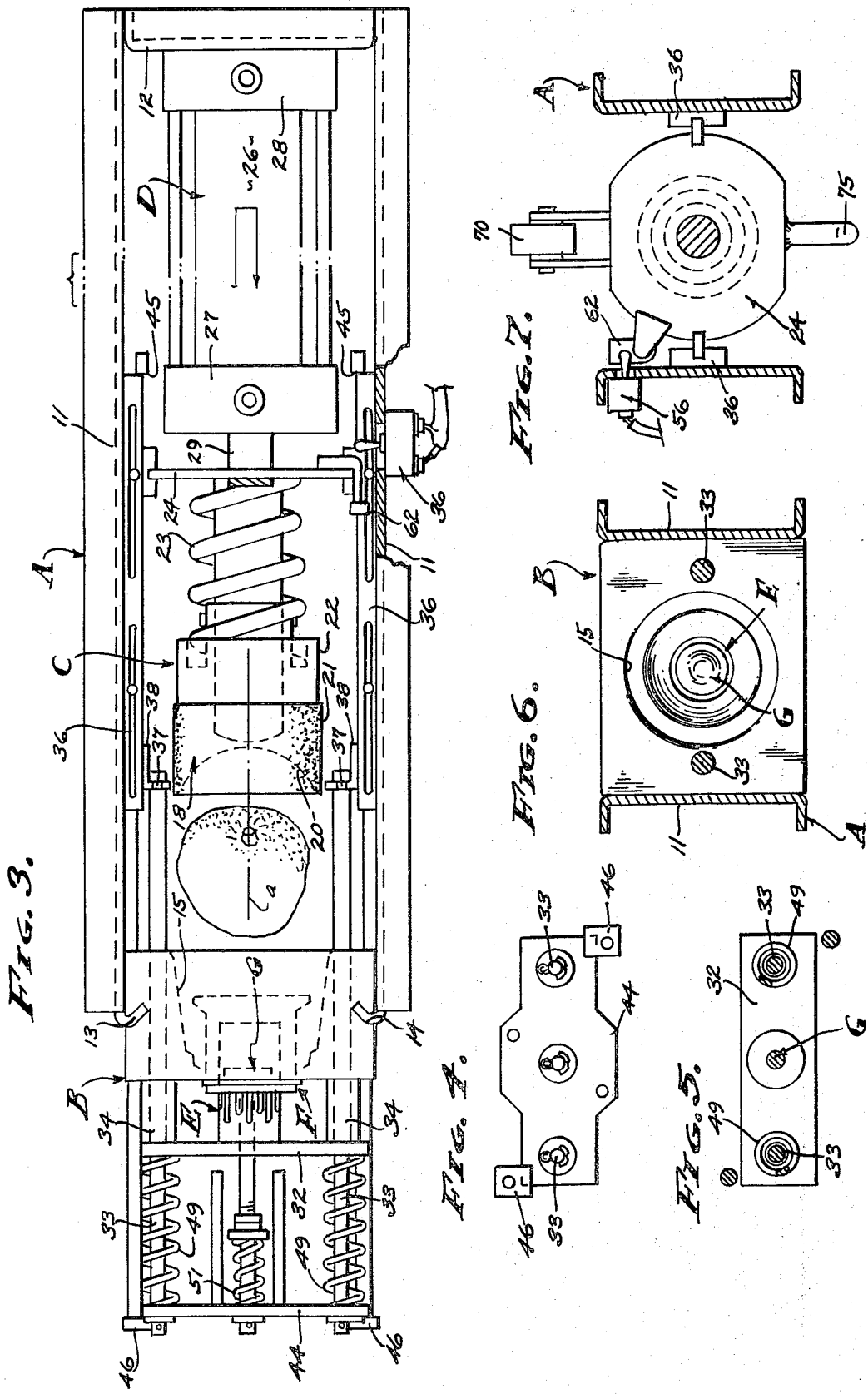

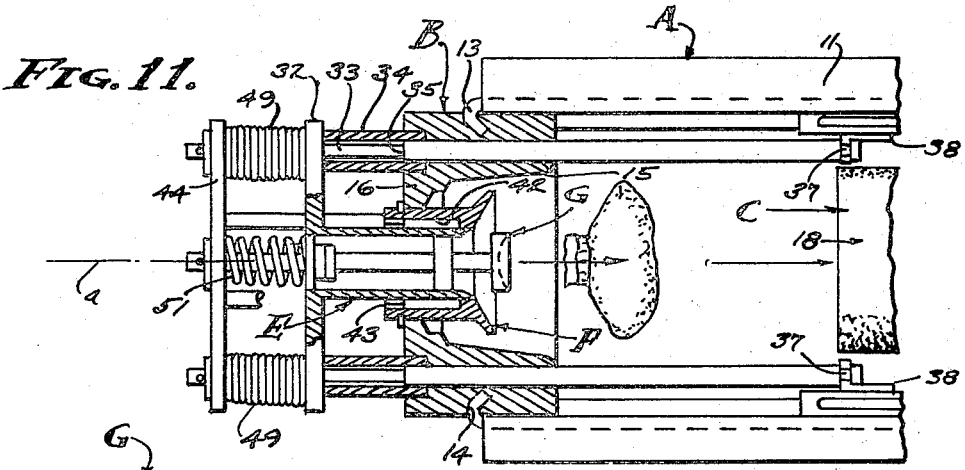
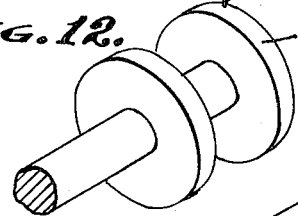
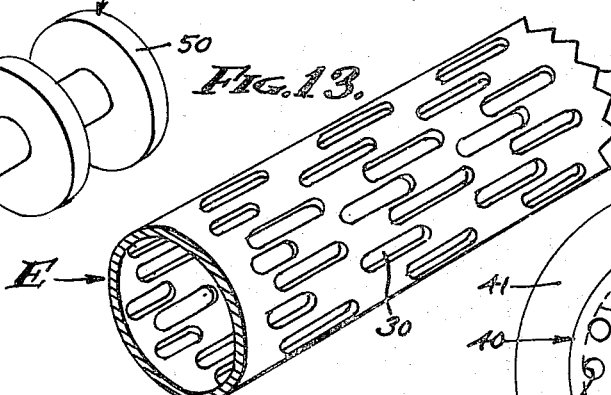
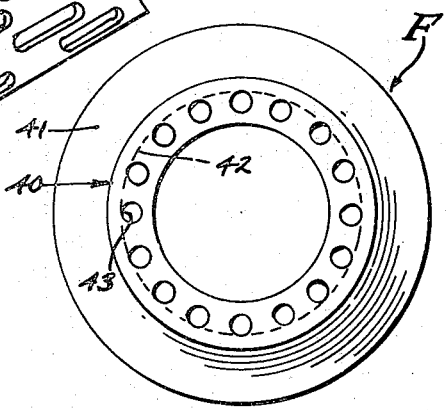
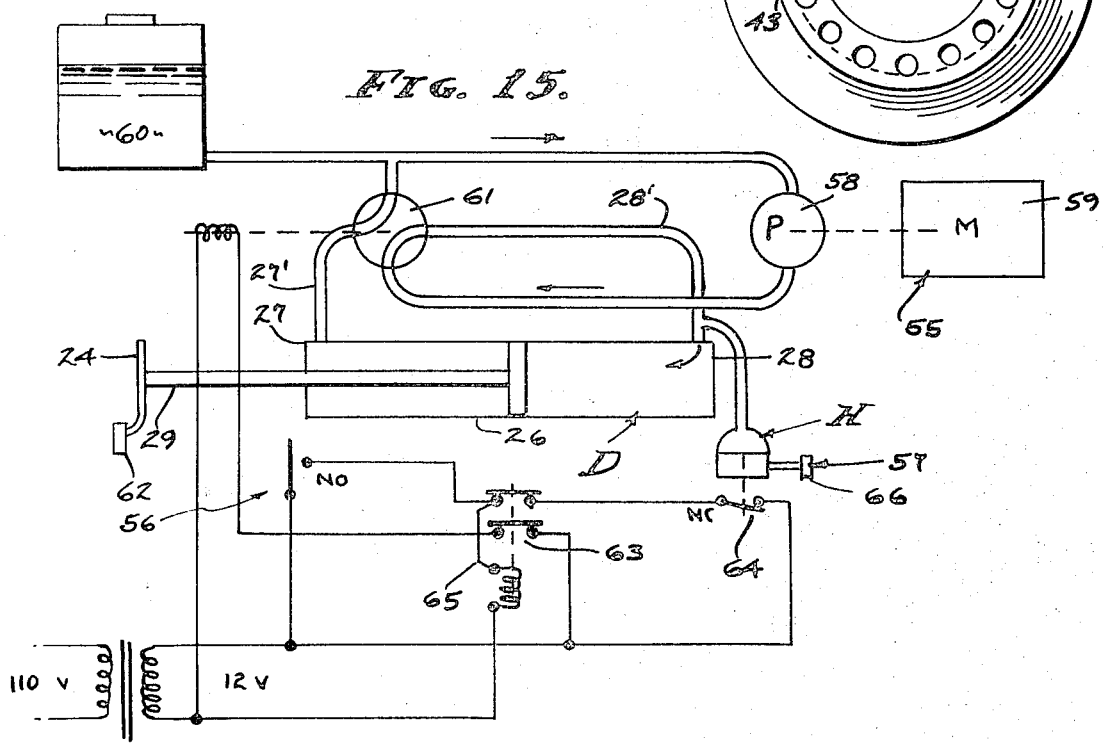

METHOD FOR CORING AND PRESSING JUICE FROM FRUITS HAVING A RIND

This application is a division of our application for Letters Patent entitled APPARATUS FOR CORING AND PRESSING JUICE FROM FRUITS HAVING A RIND, Ser. No. 55,538, filed July 16, 1970 and issued as U.S. Pat. No. 3,682,092 dated Aug. 8, 1972.

The art of extracting juice from citrus fruits having a rind has developed several methods and apparatus, and the type with which the present invention is concerned involves pressing of the fruit in order to squeeze out the juice through the rind and from the fibrous interior of the fruit. Heretofore, considerable complexity and expense has been involved in the carrying out of such methods and in the construction of apparatus to carry out the necessary mechanical functions, the timed relations of the processes and functions of apparatus coupled with the strength and durability required resulting in complex and heavy structures. Therefore, it is a primary object of this invention to apply prior art technology in a new and improved method with the inherent capability of processing fruits of varied size and hardness.

An object of this invention is to eliminate the usual requirement for heavy structure while retaining the ability to press the whole fruit substantially dry. Recognizing herein that the pressing of whole fruit involves the principles of hydraulics, in that liquid is to be extracted therefrom, the present invention meets said hydraulic requirements with hydraulic means created in a hydraulic ram and associated controls responsive to squeeze and release according to hydraulic requirements, and to the end that great force is applicable, for the most part, through static elements rather than through moving parts. Consequently, the method herein disclosed is characterized by heavy structure requirements restricted to the frame, pressing head and ram.

It is another object to provide a method of the type thus far referred to that responds to applied pressure regardless of fruit size or hardness, whereby variations in the fruit are automatically compensated for.

It is also an object of this invention to collect said juice externally of the rind, as distinguished from the projection of collection tubes into the fruit. The method hereinafter disclosed provides for the pressing of juice through a core extruded from the whole fruit and for the collection of juice conducted through said core. It is observed that the extruded core remains attached to the whole fruit by means of the interior fibers thereof.

It is still another object of this invention to reliably eject the extruded core comprised of a collection of compressed fibers and some solids or pulp; and all of which is accomplished by means of unique coring. With the present invention, there is core ejection which shears off the pulp when pressing force is released, thereby to express the core with impetus and which also carries away the remaining whole rind.

The various objects and features of this invention will be fully understood from the following detailed description of the typical preferred form and application thereof, throughout which description reference is made to the accompanying drawings, in which:

FIG. 3 is an enlarged plan view taken as indicated by line 3—3 on FIG. 2.

Figure 2:
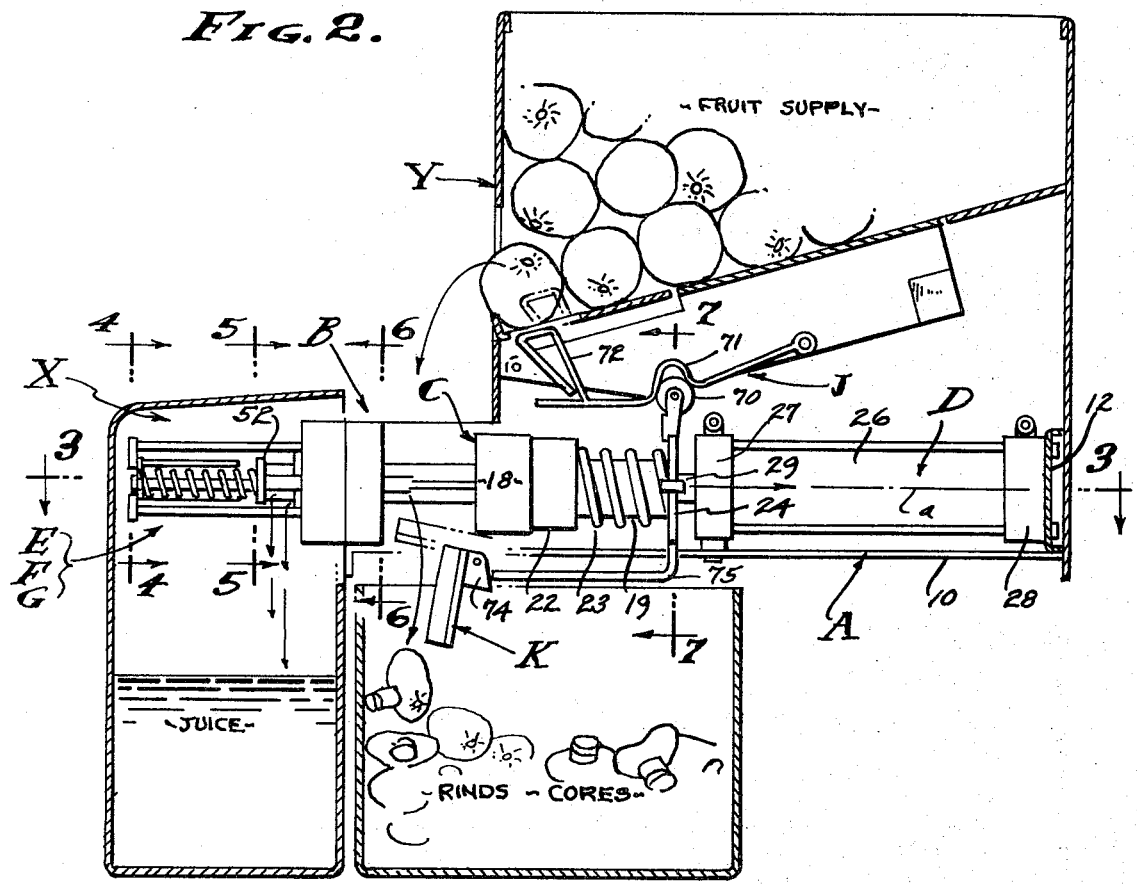
FIG. 2 is a side elevation of the apparatus and its supply and disposal features.

FIGS. 4, 5, 6 and 7 are transverse sectional views taken as indicated by lines 4—4, 5—5, 6—6 and 7—7 on FIG. 2.

FIGS. 8, 9, 10 and 11 are each a fragmentary view of a portion of the apparatus as shown in FIG. 3, each illustrating a positioning of the apparatus necessary to the process performed thereby.

Figure 9:
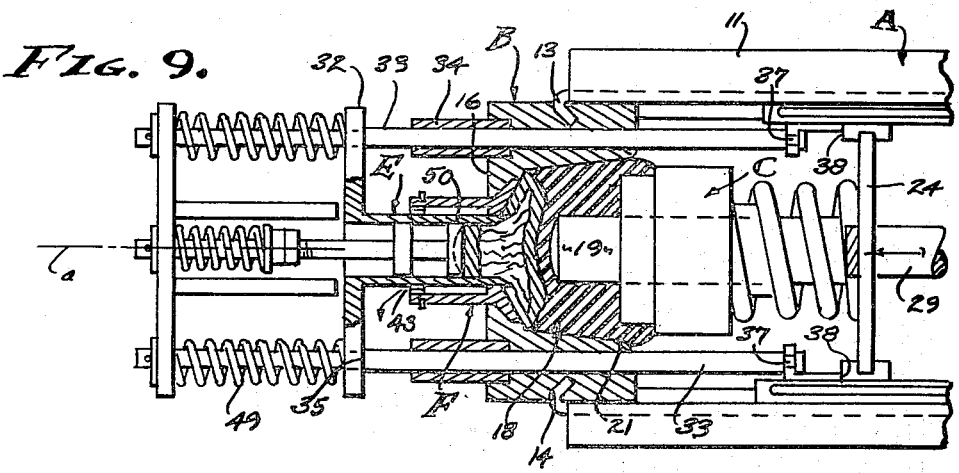
Figure 9A:
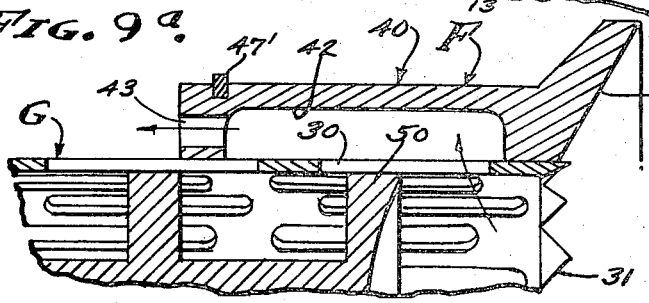

FIG. 9a is an enlarged fragmentary sectional view illustrating the coring knife and separate core and rind ejectors which characterize the invention.

FIG. 12 is a perspective illustration of the core ejector.

FIG. 13 is a perspective view of the coring knife.

FIG. 14 is an end view of the rind ejector. And,

FIG. 15 is a diagram of the pressure operative and sensitive hydraulics.

The method employed involves the pressing of juice from whole fruit having a rind, and especially from citrus fruits. Such fruits are of a kind but vary widely in size and hardness, and the rind thickness thereof varies as well. For example, oranges of the same crop vary in diameter, size and character; variable as to hardness, internal structure, and consistency of the fibers and pulp. Furthermore, the range of size between grapefruits and limes is quite substantial, it being an object herein to accommodate all such citrus fruits for juicing by one and the same process and in one and the same apparatus or machine; and with or without alteration or adaption. For example, the pressing head and ram head can be replaceably employed in varied size ranges depending upon the particular fruit to be juiced, a feature of the method and apparatus being that a wide range of fruit sizes can be accommodated within one head-ram size. Accordingly, the method comprises the separate and distinct steps of: First, supporting a fruit; second, cutting an opening in the fruit; third, confining the fruit; fourth, applying external pressure to the fruit and thereby extruding a core and displacing juice from the fruit via said opening and through said core; and fifth, to sense a predetermined build-up of said external pressure and thereafter release the same. This process is unique in the extrusion of a core from the interior of the whole fruit and in the utilization of said core to conduct juice from said interior, whereby the juice is extracted from the whole fruit at the exterior of its rind.

The first step of supporting the fruit is performed without force applied thereto and without deformation of the whole fruit. The purpose of the supporting step is solely for the location of and for holding the whole fruit positioned preparatory to the second step of the juicing process. This is a loose support for positioning purposes and is to be distinguished from complete embracement which characterizes so many of the prior art processes. Rotational orientation of the fruit is unimportant.

The second step of cutting an opening in the fruit is performed by the application of forces applied to one side of the supported whole fruit, incising a portion of the rind so as to separate it from the surrounding rind area but without separating it from its fibrous connection with the interior of the whole fruit. Thus, the incised area of the rind remains connected with the whole fruit. In practice, the incised area is round, substantially smaller in diameter than the whole fruit diameter, and it is necessarily coaxial with a radial axis extending through the center of the fruit.

The third step of confining the fruit is performed by the transfer of the whole fruit from the first mentioned support and into surrounding confinement of the intact rind, excluding confinement of the incised area of the rind. Thus, the area of the rind which is excluded from confinement is aligned with the axis of and is complementary with the said incised area of the rind.

The fourth step of applying external pressure is performed so as to compress the rind and interior fibers into a compaction of fibrous solids as a result of extruding a core of a cross section determined by the incised area configuration, accompanied by displacement of juice from the fruit interior and which flows through the core via the opening made by the incision. In practice, the compacting force or pressure application is made in opposition to an area of the rind encompassing the said incised area. The compaction of fibers forming the said core establishes a filter body through which the juices are delivered at the exterior of the intact rind surrounding the incised portion thereof.

The fifth step of sensing a predetermined build-up of the applied external pressure is operative without regard to fruit size or hardness, and is an inevitable condition that is used advantageously to release the external pressure; thereby completing the juicing process. The said inevitable condition is evidenced by the substantially complete deliverance of juice from the whole fruit, whereupon the remaining rind and internal fibers and pulp are compacted to a degree where further compression is practically impossible, and at which point a sharp pressure increase or build-up is sensed and employed to cause a release of said applied pressure. It will be seen that the completed juicing process extracts substantially all liquid from the whole fruit, leaving the rind and fibers and pulp substantially dry.

Referring now to an apparatus capable of practicing the method hereinabove described, a typical embodiment in the form of an orange juicing machine is shown throughout the drawings, there being included therein generally, a frame A, a pressing head B, a ram head C, a hydraulic motor D moving the ram head C relative to the pressing head B, a perforated coring knife E and means positioning the same coordinated with movement of the ram head C, a rind ejector F and means positioning the same coordinated with movement of the ram head C, a core ejector G, and reversible power means H for applying hydraulic pressure to the motor D. These elements A through H are cooperatively combined in a unit apparatus X that is supplied from a storage bin Y, there being an agitating fruit delivery means J coordinated with movement of the ram head C to drop one single whole fruit at a time into the aforementioned supported position; and all of which discharges processed whole fruit rinds into a bin Z, there being a trap K to support the one whole fruit when initiating the juicing process and coordinated with the movement of the ram head C to pass said pressed rind into the bin Z upon completion of the juicing process.

Figure 1:
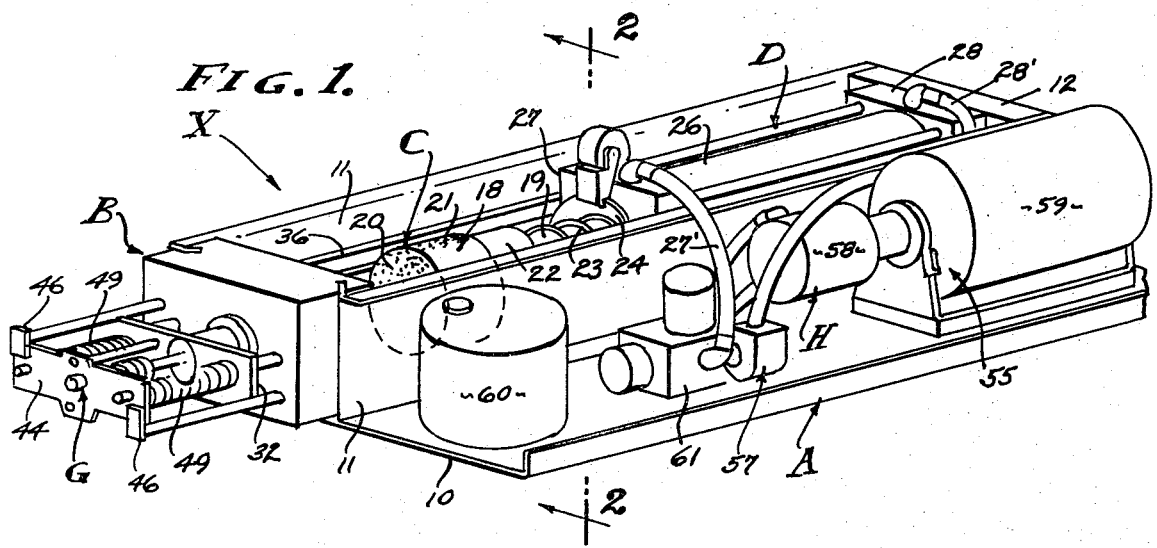
FIG. 1 is a perspective view of the hydraulic apparatus of the present invention.

The frame A is best illustrated in FIGS. 1 and 3 and comprises a mounting platform 10 and spaced parallel side members 11 carried by the platform and between which the pressing head B and ram head C operate.

The frame A is shown as a heavy sheet metal fabrication with suitable flanges for stiffening and characterized by a bulkhead 12 between one end of the spaced members 11 and by opposed tracks 13 at the other end thereof. The bulkhead 12 forms a base to mount the motor D, while the tracks 13 releasably mount the pressing head B at said other end of the side members 11. In practice, the tracks 13 are vertically disposed flanges disposed at acute angles with respect to the planes of the said members; thereby presenting a dovetailed track configuration.

The pressing head B is removably and/or releasably mounted between the side members 11 at the said other end thereof, by means of slots 14 that are complementary to the tracks 13, there being a suitable stop (the platform 10) to hold the head in an aligned position on an operational axis $a$. The pressing head B comprises a fruit receiving bore 15 opening inwardly toward the bulkhead 12, bore 15 being divergently flared toward its opening and sufficiently large in diameter to receive the whole undeformed fruit to be juiced. The outer end of the bore 15 terminates at an inwardly turned flange 16 of limited radial extent, the said other end of the bore 15 being open to receive (reciprocably) the coring knife E, and the two ejectors F and G. In practice, the pressing head B can be formed of a rectangular solid, as shown in FIG. 1, with the coordinating means of the apparatus carried thereby adjacent to the outer face 17 thereof.

Figure 8:
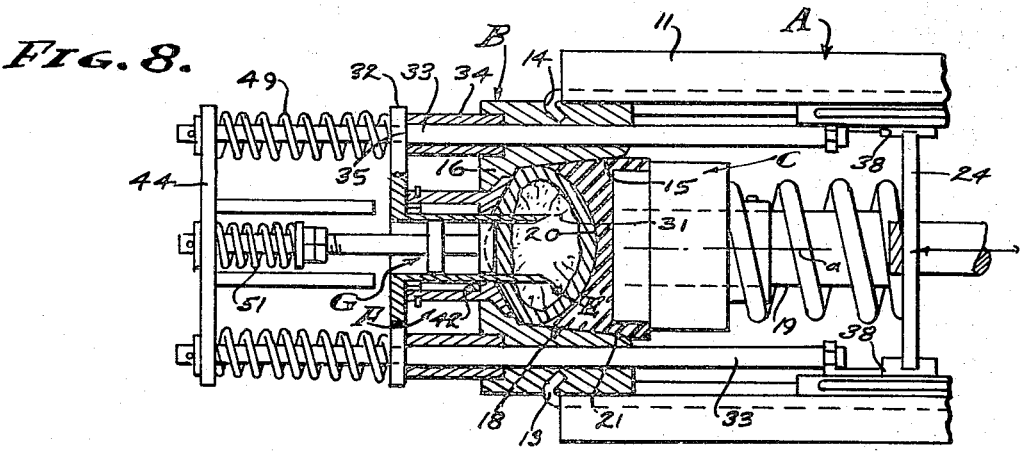

The ram head C is shiftable along the axis $a$ and comprises, a piston 18 of elastomeric material adapted to enter the bore 15 and seal therewith, and a ram 19 that forwardly deforms the piston thereby to apply external pressure to the whole fruit within the bore. The piston 18 is a cylindrical solid of rubber or the like having a concaved forwardly faced wall 20 and a surrounding peripheral wall 21 adapted to slide into and to seal with the inner diameter wall of the bore 15. The peripheral wall 21 is backed by a presser ring 22 that is yieldingly urged forwardly by a spring means 23 carried reciprocably by a cross head 24 that is shifted by the motor D. The ram 19 is rigidly carried by the cross head 24 and enters through the presser ring 22 to press the wall 20 forwardly and to evert the same into a convex configuration, or the like, as best illustrated in FIG. 9; thereby exacting external pressure upon the whole fruit and pressing it dry. The piston 18 is of sufficient body to permit flow of the elastomer into the various configurations shown for example in FIGS. 8 through 11.

The hydraulic motor D is preferably a liquid operated cylinder and piston motor adapted to reciprocate forwardly and rearwardly, and which comprises a cylinder 26 closed by cylinder heads 27 and 28, and a piston and rod 29 that projects reciprocably through the head 27. The motor D is double acting and has a fluid line 27' entering the cylinder at head 27, and a fluid line 28' entering the cylinder at head 28. As shown, the closed head 28 is mounted to the bulkhead 12 with the axis of the piston and rod 29 coincidental with the operational axis $a$. The cross head 24 is rigidly carried by the exposed and reciprocably movable end of the rod 29, thereby moving the piston 18 and ram 19 as hereinabove described.

The coring knife E is a thin walled elongated tubular member that is characteristically perforated and formed so as to have a screen 30 following a sharpened incising edge 31. It is preferred that the knife E be tubularly cylindrical with a serrated sharpened leading edge 31 smaller in diameter than the whole fruit being juiced, and in accordance with the invention the knife E is held coaxial with the axis a and the sharpened end thereof retractable from the bore 15 of the pressing head B. The projected fruit receiving position thereof is best illustrated in FIGS. 3 and 8, while the retracted juicing position thereof is best illustrated in FIG. 9. The latter retracted position permits eversion of the piston 18 without incising the other side of the whole fruit rind, and thereby assures extraction through the incision through the one side of the fruit. A feature is the sealing of the rind with the bottom of the ejector F, so that peel oil is excluded and also so that there is no leakage of juice out of the fruit except through the extruded core thereof.

The means positioning the coring knife E is carried by the pressing head B and is responsive to the advancement of the cross head 24. The means now under consideration comprises a header 32 that is movably carried "to and from" the face 17 by guide posts 33, preferably a pair of spaced posts 33, one at each side of the head B and projecting therefrom on parallel axes. The foremost "to" position of the header 32 is restricted by a pair of like stop sleeves 34, while the header 32 is slideably carried over the outer end portions of the post 33 to seat upon lift shoulders thereof at 35. The posts 33 are reciprocably carried in openings through the head B to slide therein, and they are spaced to be engaged and reciprocated forwardly by the cross head 24, in order to lift the header 32 "from" the face 17. In practice and for purposes hereinafter described, the posts 33 are coupled directly to lost motion slides 36 which are shifted directly by the cross head 24 and which transfer motion to said posts. The said coupled engagement is effected by upwardly opening slots in the slides at 37 and which receive spooled ends of the post 33 when the pressing head B is installed. The coring knife E is rigid with the header 32 and is held thereby to reciprocate on the axis a, there being abutments 38 engaging the cross head 24 that shift the posts 33 and knife E when the cross head moves between the foremost positions as shown in FIGS. 8 and 9.

The rind ejector F is a tubular member that surrounds the coring knife E and which is characteristically manifolded to collect liquids that are hydraulically extracted from the whole fruit and delivered through the extruded core and from the screen 30. The ejector F comprises, a cylindrical manifold 40 reciprocably carried within the flange 16 of head B, and a chamber bottom 41 projecting radially from the manifold and to the inner diameter wall of bore 15, at the bottom thereof and to stop forwardly against said flange. As best shown in FIGS. 8 and 9, the bottom 41 establishes a movable concaved wall engageable with the rind of the fruit surrounding the incision therein, while the manifold 40 has an inner diameter wall 42 that surrounds the coring knife E with clearance so as to form an annulus for the collection of juice. As best illustrated in FIG. 9a, the screen 31 permits the radially outward flow of juice from the extruded core and into the manifold annulus, from which the juice is discharged through delivery ports 43.

The means positioning the rind ejector F is carried by the pressing head B and is responsive to the retraction of the cross head 24. The means now under consideration comprises a depressor 44 that engages and moves the ejector F from the flange 16 and to an ejecting position as shown in FIG. 11, and after such extreme positioning the depressor returns partially as best illustrated in FIG. 3, the depressor 44 being carried "to and from" the face 17 by the guide posts 33 with a "from" limit established by stop 46. The rearmost "from" positioning is shown in FIG. 11, there being abutments 45 (shown in FIG. 3) engaging the cross head 24 that shift the posts 32 and thereby move the depressor to engage the rind ejector F. The depressor 44 is yieldingly held against the stops 35 by spring means 49 and a snap ring 47' maintains assembly of the rind ejector, operable between the extreme positions shown. Note the lost motion of the slide 36 with respect to the cross head 24, as effected by the distance between the abutments 38 and 45 (see FIG. 3) thereby to effect retraction of the coring knife E at the forward end of travel, and protraction of the ejector F at the rear end of travel.

Figure 10:
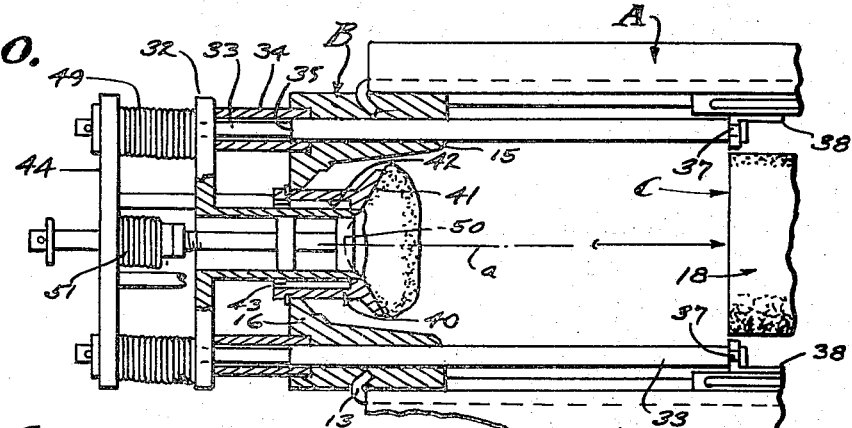

The core ejector G reciprocates within the coring knife E to yield to the core that extrudes from the interior of the fruit when external pressure is applied thereto. Accordingly, the ejector is yieldingly biased to resist extrusion of the fruit core and thereby controls the compaction thereof, permitting the said core to enter into the screen 31 to be compacted therein and to act as a filter for the juice that flows through and from the core for delivery radially through the screen 31. The core ejector G initially moves with the coring knife E until the header 32 is stopped by the sleeves 34, and is so moved by the depressor 44 that is held extended by the compression spring means 49 operable against the header 32. The ejector G comprises, a plunger 50 reciprocably carried within the screen 30 of knife E, and a spring means 51 yieldingly urging the plunger 50 to be protracted from the rind ejector (see FIG. 11). A stop 52 limits retraction of the plunger 50, the stop 52 being positioned so as to permit protraction of the plunger 50 substantially beyond the knife edge 31, after the spring means 51 is fully compressed so as to positively force the plunger 50 to move to the edge 31 thereby shearing all fibers occuring through the perforations of screen 30. As a consequence, the final shearing of fibers occurs as shown in FIG. 10, in which position the spring means 51 is fully compressed and whereupon the extruded core is released and accelerated and ejected with the rind attached thereto (see FIG. 11).

The reversible power means H that applied hydraulic pressures to the motor D is shown physically in FIG. 1 and diagrammatically in FIG. 15. As above described, the motor D is a double acting cylinder and piston unit having two directions of movement, to either advance or to retract the ram head C. Accordingly, the means H comprises, a hydraulic pressure source 55, means 56 to advance the motor upon retraction thereof, and means 57 to retract the motor upon build-up of fluid pressure therein. The pressure source 55 is preferably a liquid pump 58 continuously driven by an electric motor 59, said pump drawing liquid from a reservoir 60 and delivering liquid under pressure to a solenoid opened valve 61. The valve 61 is a four-way valve adapted to charge either head of the motor D while exhausting the other respectively, and to advance the piston and rod 29 when the solenoid thereof is electrically energized. The means 56 comprises a normally open switch closed by an operator 62 on the cross head 24 when it is fully retracted and a normal open holding relay 63 that is closed thereby. The means 57 to retract the piston and rod 29 comprises a pressure responsive normally closed switch 64 in a series holding circuit 65 through the relay 63, and operative to drop the electrical circuit to the solenoid of valve 61. As a consequence, there being a condition of equilibrium between the force externally applied to the whole fruit ahead of the ram head C and the force applied within the motor D, the reversible means H is sensitive to the force exerted and is set a predetermined pressure by means of a suitable adjustment 66 to retract the ram head C regardless of the size and hardness of the whole fruit being juiced.

The means J for delivering one whole fruit at a time is coordinated with movement of the cross head 24 that shifts the ram head C, and is best illustrated in FIG. 2. Means J both agitates and delivers one whole fruit for each cycle of operation and comprises, a roller 70 carried on the cross head 24 and a cam follower 71 pivoted in the storage bin Y. Upon complete retraction of the cross head 24 the follower 71 drops a gate 72 that lowers one whole fruit into delivery position. Upon continued and initial forward movement of the cross head 24 the follower 71 lifts the gate 72 which then boosts said one whole fruit out of delivery position and drops it between the pressing head B and ram head C. Referring to the phantom position shown in FIG. 2, the trap K comprises a cam 74 engageable with a rail 75 movable with the cross head 24. Engagement of the rail with the cam swings the trap upwardly and supports the whole fruit immediately following return from the fully retracted position, and so as to guide the whole fruit into the bore 15 when the ram head C moves forwardly into engagement therewith.

From the foregoing it will be seen that the method is conducive to the efficient production of high quality juice from a wide range of fruit sizes regardless of hardness or rind thickness. It is to be observed that the collection of extracted juice is exclusively from the interior of the whole fruit, and that excess peel-oil is excluded by virtue of isolation of the rind exterior and of the rind remaining substantially intact, followed by filtration of juice through the protracted core. It is significant that a circular or like incision is made through the rind at one side of the fruit and that the externally applied pressure affects hydraulic extrusion of a core. The juice is screened while being first collected and thereafter delivered as finished juice.

Having described only a typical preferred form and application of our invention, we do not wish to be limited or restricted to the specific details herein set forth, but wish to reserve to ourselves any modifications or variations that may appear to those skilled in the art.

Having described our invention, we claim:

1. In the juicing of whole fruit having a rind, the improvements comprising, supporting the whole fruit with one side thereof exposed, incising an opening in the rind and defining an area thereof remaining attached to the internal fruit fibers at said one side of the fruit and displaced to the exterior of the intact surrounding area of the rind, confining the said intact area of the rind and applying external pressure thereto deforming the whole fruit and thereby hydraulically extruding the displaced and attached area a limited distance and substantially all of the juice of the whole fruit from said opening.

2. The improvement in juicing whole fruit as set forth in claim 1 and wherein the incising of an opening is through the rind only at said one side of the fruit.

3. The improvement in juicing whole fruit as set forth in claim 1 and wherein the incising of an opening is a circular cut through the rind and substantially smaller in diameter than the fruit diameter.

4. The improvement in juicing whole fruit as set forth in claim 1 and wherein the confining of said intact area includes enclosing the whole fruit excepting the opening area of the rind within the incision.

5. The improvement in juicing whole fruit as set forth in claim 1 and wherein the confining of the said intact area includes yieldingly enclosing the whole fruit and deforming the whole fruit through said yielding enclosure.

6. The improvement in juicing whole fruit as set forth in claim 1 and wherein internal fruit fibers are extruded through said opening with the extruded juice by the application of external pressure to the whole fruit.

7. The improvement in juicing whole fruit as set forth in claim 1 and wherein the extrusion of juice of the whole fruit is from a core of internal fruit fibers protracted through said opening by the application of external pressure to the whole fruit.

8. The improvement in juicing whole fruit as set forth in claim 1 and wherein the extraction of juice of the whole fruit is from a core of internal fruit fibers protracted through said opening and displacing the separated area of the rind from the confined surrounding area thereof, by the application of external pressure to the whole fruit.

9. The improvement in juicing whole fruit as set forth in claim 1, wherein the incising of an opening is a circular cut through the rind only and substantially smaller in diameter than the fruit diameter, wherein the confining of said intact area includes yieldingly enclosing the whole fruit excepting the opening area of the rind within the incision and deforming the whole fruit through said yielding enclosure, and wherein the extrusion of juice of the whole fruit is from a core of internal fruit fibers protracted through said opening by the application of external pressure to the whole fruit and displacing the attached area of the rind to the exterior of the confined surrounding area thereof.

10. In the juicing of whole fruit having a rind and of varied size and hardness, the improvement comprising cutting an opening in the rind thereby separating a fiberously attached area thereof from an intact surrounding area thereof, confining said intact area of the fruit, applying external pressure to said intact area, deforming the whole fruit and thereby hydraulically extruding the fiberously attached area a limited distance and the juice of the whole fruit through said opening, and removing said external pressure upon build-up of a predetermined external pressure caused by depletion of fluids from the internals of the whole fruit, thereby leaving the juiced rind and said fiberously attached area substantially dry regardless of fruit size and hardness.

11. The improvement in juicing whole fruit as set forth in claim 10 and wherein the juicing pressure internally of the fruit does not exceed the said build-up of said external pressure, thereby assuring said depletion of fluids from the internals of the whole fruit.

12. The improvement in juicing whole fruit as set forth in claim 10 and wherein the opening in said fruit is effected by making an incision in the rind and separating an area from the intact surrounding area thereof, protracting internal fruit fibers through said opening with the extrusion of juice through the same, and compacting said protracted fibers for said build-up of external pressure upon the juiced rind.

13. The improvement in juicing whole fruit as set forth in claim 10 wherein the opening in said fruit is effected by making an incision in the rind and separating an area from the intact surrounding area thereof, protracting internal fluid fibers through said opening with the extrusion of juice through the same, and compacting said protracted fibers for said build-up of external pressure thereupon commensurate with the external build-up of pressure upon the intact surrounding area of the rind, and wherein the juicing pressure internally of the fruit does not exceed the said build-up of said external pressure to effect said compaction of protracted fibers, thereby assuring said depletion of fluids from the internals of the whole fruit.

14. The improvement in juicing whole fruit as set forth in claim 10 and wherein the opening in said fruit is effected by making an incision in the rind and defining an area of rind remaining attached to the interior fruit fibers and separated from the surrounding intact area of the rind.

* * * * *